US008922574B2

(12) United States Patent
Lim et al.

(10) Patent No.: US 8,922,574 B2
(45) Date of Patent: Dec. 30, 2014

(54) METHOD AND APPARATUS FOR DRIVING LIQUID CRYSTAL DISPLAY DEVICE

(75) Inventors: Jung-hyun Lim, Suwon-si (KR); Hong-ki Kwon, Hwaseong-si (KR); Deok-soo Park, Seoul (KR); Sang-hoon Ha, Seoul (KR); Byoung-ju Song, Gwangju (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 163 days.

(21) Appl. No.: 13/420,790

(22) Filed: Mar. 15, 2012

(65) Prior Publication Data

US 2012/0235962 A1 Sep. 20, 2012

(30) Foreign Application Priority Data

Mar. 15, 2011 (KR) ........................ 10-2011-0022887

(51) Int. Cl.
*G06T 9/00* (2006.01)
*G09G 3/36* (2006.01)

(52) U.S. Cl.
CPC .......... *G09G 3/3648* (2013.01); *G09G 2360/18* (2013.01); *G09G 2340/16* (2013.01); *G09G 2340/02* (2013.01); *G09G 2320/0261* (2013.01); *G09G 2360/16* (2013.01); *G09G 2320/0252* (2013.01); *G09G 2320/103* (2013.01)
USPC .............................. 345/555; 345/204; 345/87

(58) Field of Classification Search
None
See application file for complete search history.

(56) References Cited

U.S. PATENT DOCUMENTS

2010/0207953 A1* 8/2010 Kim et al. .................... 345/555

FOREIGN PATENT DOCUMENTS

| | | |
|---|---|---|
| JP | 2010-002668 | 1/2010 |
| JP | 2010-066384 | 3/2010 |
| KR | 1020100094222 A | 8/2010 |

* cited by examiner

*Primary Examiner* — Joseph Haley
*Assistant Examiner* — Ifedayo Iluyomade
(74) *Attorney, Agent, or Firm* — Volentine & Whitt, PLLC

(57) ABSTRACT

A liquid crystal display (LCD) device comprises an image signal processing unit that selectively compensates a current frame upon determining that it is part of a sequence of changing images as opposed to a sequence of still images. The image signal processing device comprises an encoding/decoding unit that generates comparison frame decoding data by encoding and decoding comparison frame data, generates reference frame decoding data by encoding and decoding reference frame data, and a determining unit that sets a comparison range based on effective bits in the comparison frame decoding data and effective bits in the reference frame decoding data, and compares the comparison frame decoding data and the reference frame decoding data within the comparison range.

12 Claims, 11 Drawing Sheets

FIG. 3

| MODE | SUB MODE | MODE INFORMATION | | | | | | | EFFECTIVE BITS | | | | | | | | | | | | | | | | | | | | | | | | ERROR INFORMATION | | |
|---|---|---|---|---|---|---|---|---|---|---|---|---|---|---|---|---|---|---|---|---|---|---|---|---|---|---|---|---|---|---|---|---|---|---|---|
| | | 6 | 5 | 4 | 3 | 2 | 1 | 0 | R | | | | | | | | G | | | | | | | | B | | | | | | | | R | G | B |
| 0 | – | 0 | 0 | 0 | 0 | × | × | × | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 | 0 | 0 | 0 |
| 1 | – | 0 | 0 | 0 | 1 | × | × | × | 7 | 6 | 5 | 4 | 3 | 2 | | | 7 | 6 | 5 | 4 | 3 | 2 | 1 | | 7 | 6 | 5 | 4 | 3 | 2 | | | 2 | 1 | 2 |
| 2 | – | 0 | 0 | 1 | 0 | × | × | × | 7 | 6 | 5 | 4 | 3 | | | | 7 | 6 | 5 | 4 | 3 | 2 | | | 7 | 6 | 5 | 4 | 3 | | | | 3 | 2 | 3 |
| 3 | – | 0 | 0 | 1 | 1 | × | × | × | 7 | 6 | 5 | 4 | 3 | | | | 7 | 6 | 5 | 4 | 3 | | | | 7 | 6 | 5 | 4 | 3 | | | | 3 | 3 | 3 |
| 4 | – | 0 | 1 | 0 | 0 | × | × | × | 7 | 6 | 5 | 4 | 3 | | | | 7 | 6 | 5 | 4 | 3 | | | | 7 | 6 | 5 | 4 | 3 | | | | 3 | 3 | 3 |
| 5 | – | 0 | 1 | 0 | 1 | × | × | × | 7 | 6 | 5 | 4 | 3 | | | | 7 | 6 | 5 | 4 | 3 | | | | 7 | 6 | 5 | 4 | 3 | | | | 3 | 3 | 3 |
| 6 | – | 0 | 1 | 1 | 0 | × | × | × | 7 | 6 | 5 | 4 | | | | | 7 | 6 | 5 | 4 | 3 | | | | 7 | 6 | 5 | 4 | | | | | 4 | 3 | 4 |
| 7 | – | 0 | 1 | 1 | 1 | × | × | × | 7 | 6 | 5 | 4 | | | | | 7 | 6 | 5 | 4 | | | | | 7 | 6 | 5 | 4 | | | | | 4 | 4 | 4 |
| 8 | – | 1 | 0 | 0 | 0 | × | × | × | 7 | 6 | 5 | 4 | | | | | 7 | 6 | 5 | 4 | | | | | 7 | 6 | 5 | 4 | | | | | 4 | 4 | 4 |
| 9 | – | 1 | 0 | 0 | 1 | × | × | × | 7 | 6 | 5 | 4 | | | | | 7 | 6 | 5 | 4 | | | | | 7 | 6 | 5 | 4 | | | | | 4 | 4 | 4 |
| 10 | – | 1 | 0 | 1 | 0 | × | × | × | 7 | 6 | 5 | | | | | | 7 | 6 | 5 | 4 | | | | | 7 | 6 | 5 | | | | | | 5 | 4 | 5 |
| 11 | 0 | 1 | 0 | 1 | 1 | 0 | 0 | × | 7 | 6 | 5 | | | | | | 7 | 6 | 5 | 4 | | | | | 7 | 6 | 5 | | | | | | 5 | 4 | 5 |
| | 0 1 | 1 | 0 | 1 | 1 | 0 | 1 | × | 7 | 6 | 5 | | | | | | 7 | 6 | 5 | | | | | | 7 | 6 | 5 | 4 | | | | | 5 | 5 | 4 |
| | 2 | 1 | 0 | 1 | 1 | 1 | 0 | × | 7 | 6 | 5 | 4 | | | | | 7 | 6 | 5 | | | | | | 7 | 6 | 5 | | | | | | 4 | 5 | 5 |
| 12 | – | 1 | 1 | 0 | 0 | × | × | × | 7 | 6 | 5 | | | | | | 7 | 6 | 5 | | | | | | 7 | 6 | 5 | | | | | | 5 | 5 | 5 |
| 13 1 | 0 | 1 | 1 | 0 | 1 | 0 | 0 | × | 7 | 6 | 5 | 4 | 3 | | | | 7 | 6 | 5 | 4 | 3 | 2 | | | 7 | 6 | 5 | 4 | 3 | | | | 3 | 2 | 3 |
| | 1 | 1 | 1 | 0 | 1 | 0 | 1 | × | 7 | 6 | 5 | 4 | | | | | 7 | 6 | 5 | 4 | 3 | | | | 7 | 6 | 5 | 4 | | | | | 4 | 3 | 4 |
| | 2 | 1 | 1 | 0 | 1 | 1 | 0 | × | 7 | 6 | 5 | | | | | | 7 | 6 | 5 | 4 | | | | | 7 | 6 | 5 | | | | | | 5 | 4 | 5 |
| | 3 | 1 | 1 | 0 | 1 | 1 | 1 | × | 7 | 6 | | | | | | | 7 | 6 | 5 | | | | | | 7 | 6 | | | | | | | 6 | 6 | 6 |
| 14 | – | 1 | 1 | 1 | 0 | × | × | × | 7 | 6 | 5 | 4 | 3 | 2 | | | 7 | 6 | 5 | 4 | 3 | 2 | | | 7 | 6 | 5 | 4 | 3 | 2 | | | 2 | 2 | 2 |
| 15 0 | 0/0 | 1 | 1 | 1 | 1 | 0 | 0 | 0 | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 | 0 | 0 | 0 |
| | 0/1 | 1 | 1 | 1 | 1 | 0 | 0 | 1 | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 | 0 | 0 | 0 |
| | 0/2 | 1 | 1 | 1 | 1 | 0 | 1 | 0 | 7 | 6 | 5 | 4 | 3 | 2 | | | 7 | 6 | 5 | 4 | 3 | 2 | | | 7 | 6 | 5 | 4 | 3 | 2 | | | 2 | 2 | 2 |
| | 0/3 | 1 | 1 | 1 | 1 | 0 | 1 | 1 | 7 | 6 | 5 | 4 | 3 | 2 | | | 7 | 6 | 5 | 4 | 3 | 2 | | | 7 | 6 | 5 | 4 | 3 | 2 | | | 2 | 2 | 2 |
| | 1 | 1 | 1 | 1 | 1 | 1 | × | × | 7 | 6 | 5 | 4 | 3 | 2 | | | 7 | 6 | 5 | 4 | 3 | 2 | | | 7 | 6 | 5 | 4 | 3 | 2 | | | 2 | 2 | 2 |

FIG. 7

| FRAME | 1 PIXEL | 2 PIXEL | 3 PIXEL | 4 PIXEL | 5 PIXEL | 6 PIXEL | DATA |
|---|---|---|---|---|---|---|---|
| 1 | 15 | 15 | 15 | 127 | 127 | 127 | Org Data |
| | 15 | 15 | 0 | 112 | 127 | 127 | Dec Data |
| | 15 | 13 | 16 | 120 | 125 | 127 | Filter Data |
| 2 | 15 | 15 | 15 | 15 | 127 | 127 | Org Data |
| | 15 | 15 | 15 | 15 | 127 | 127 | Dec Data |
| | 15 | 15 | 15 | 29 | 123 | 127 | Filter Data |
| 3 | 15 | 15 | 15 | 15 | 15 | 127 | Org Data |
| | 15 | 15 | 15 | 15 | 0 | 127 | Dec Data |
| | 15 | 15 | 15 | 13 | 16 | 120 | Filter Data |
| 4 | 15 | 15 | 15 | 15 | 15 | 15 | Org Data |
| | 15 | 15 | 15 | 15 | 15 | 15 | Dec Data |
| | 15 | 15 | 15 | 15 | 15 | 29 | Filter Data |

METHOD AND APPARATUS FOR DRIVING LIQUID CRYSTAL DISPLAY DEVICE

CROSS-REFERENCE TO RELATED APPLICATIONS

This application claims priority under 35 U.S.C. §119 to Korean Patent Application No. 10-2011-0022887 filed on Mar. 15, 2011, the disclosure of which is hereby incorporated by reference.

BACKGROUND OF THE INVENTION

The inventive concept relates generally to liquid crystal display (LCD) technology. More particularly, the inventive concept relates to methods and apparatuses for driving an LCD device to improve image quality.

An LCD device comprises a liquid crystal panel having a liquid crystal layer disposed between two substrates, a backlight unit that provides light to the liquid crystal panel, and a driving circuit that drives the liquid crystal panel to display a sequence of image signals. The performance of the LCD device is limited by the response time of the liquid crystal layer, as the response time affects the rate at which images appear on the liquid crystal panel.

Researchers have developed methods to improve response time of the liquid crystal layer by comparing an image signal of a previous frame with an image signal of a current frame and then generating a compensated image signal for the current frame. In these methods, a frame memory stores the image signal of the previous frame, and the stored image signal is compressed in order to reduce the required capacity of the frame memory.

Unfortunately, these methods suffer from a variety of shortcomings that can deteriorate the quality of displayed images. For example, where noise is present in an image signal of a still image, it may be recognized as an image signal of a moving picture, and the image signal may be unnecessarily compensated such that the noise is amplified. The noise may also be amplified while the image signal is compressed and then restored, which can further deteriorate the image quality of a LCD device. In addition, in a moving picture signal, an error may occur when compressing and restoring an image signal, such that a pixel-shaking problem arises due to the error.

SUMMARY OF THE INVENTION

Embodiments of the inventive concept provide methods of driving an LCD device that can reduce image quality deterioration due to noise. Embodiments of the inventive concept also provide methods of driving an LCD device that can reduce image quality deterioration due to errors that occur during image compression and restoration.

In one embodiment, a method of driving an LCD device comprises generating comparison frame decoding data by encoding and decoding comparison frame data in a first mode, generating reference frame decoding data by encoding and decoding reference frame data in a second mode, setting a comparison range as a first effective range or a second effective range, wherein the first effective range corresponds to effective bits in the comparison frame decoding data, and the second effective range corresponds to effective bits in the reference frame decoding data, and comparing the comparison frame decoding data and the reference frame decoding data within the comparison range.

In another embodiment, a method of driving an LCD device comprises generating comparison frame decoding data and reference frame decoding data by encoding and decoding comparison frame data and reference frame data, respectively, generating comparison frame filtering data by filtering the comparison frame decoding data, determining whether the reference frame data and the comparison frame data are the same by comparing the comparison frame decoding data and the reference frame decoding data, and upon determining that the reference frame data and the comparison frame data are not the same, compensating the reference frame data based on the reference frame data and the comparison frame filtering data and outputting reference frame compensation data.

In another embodiment, an image signal processing unit for an LCD device comprises an encoding/decoding unit that generates comparison frame decoding data by encoding and decoding comparison frame data, generates reference frame decoding data by encoding and decoding reference frame data, and a determining unit that sets a comparison range based on effective bits in the comparison frame decoding data and effective bits in the reference frame decoding data, and compares the comparison frame decoding data and the reference frame decoding data within the comparison range.

BRIEF DESCRIPTION OF THE DRAWINGS

The drawings illustrate selected embodiments of the inventive concept. In the drawings, like reference numbers indicate like features.

FIG. 3 illustrates mode information, effective bits, and error information that correspond to different encoding modes of an encoding unit in an LCD device.

FIG. 7 illustrates an example of previous frame filtering data filtered by a filtering unit of FIG. 6.

DETAILED DESCRIPTION

Embodiments of the inventive concept are described below with reference to the corresponding drawings. These embodiments are presented as teaching examples and should not be construed to limit the scope of the inventive concept.

In the description that follows, where a feature is referred to as being "on", "connected to," or "coupled with" another feature, it can be directly on the other feature, or intervening features may also be present. However, where a feature is referred to as being "directly on", "directly connected to" or "directly coupled with" another feature, it will be understood that there are no intervening features. The term "and/or" indicates any combination of one or more of a list of items.

Although the terms "first" and "second", etc., are used to describe various features, these terms are not limiting of the features. Rather, they are merely used to distinguish between different features. Terms in the singular form may encompass plural forms as well, unless the context or description indicates otherwise. Terms such as "comprise," "comprising," "include," or "including" are used to indicate the presence of a recited feature, but they do not exclude the presence of additional features. Unless indicated to the contrary, all terms including descriptive or technical terms should be construed as having meanings understood by ordinary skill in the art.

Figure 1:
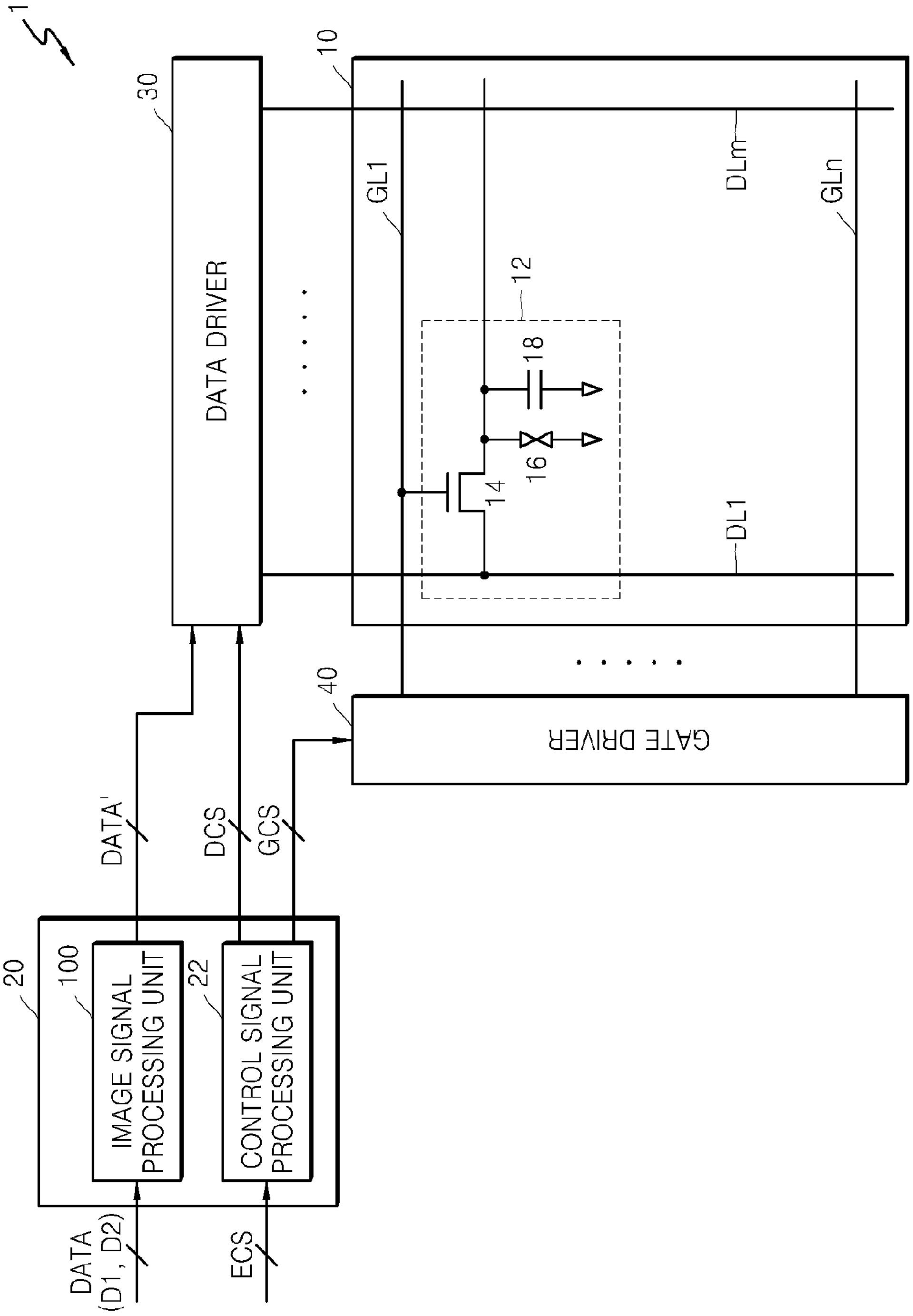
FIG. 1 is a block diagram of an LCD device according to an embodiment of the inventive concept.

FIG. 1 is a block diagram of an LCD device 1 according to an embodiment of the inventive concept.

Referring to FIG. 1, LCD device 1 comprises a liquid crystal panel 10, a timing controller 20, a data driver 30, and a gate driver 40.

Liquid crystal panel 10 comprises an upper substrate and a lower substrate that are combined while facing each other, and a liquid crystal interposed between the upper and lower substrates. Liquid crystal panel 10 further comprises a plurality of pixels 12 arrayed in a matrix. Each of pixels 12 comprises a thin film transistor (TFT) 14, a liquid crystal capacitor 16, and a storage capacitor 18.

Liquid crystal panel 10 still further comprises a plurality of gate lines GL1 through GLn that extend in a row direction and are separated from each other in a column direction, and a plurality of data lines DL1 through DLm that are disposed to cross gate lines GL1 through GLn while data lines DL1 through DLm extend in a column direction and are separated from each other in a row direction. TFT 14 is connected to a corresponding gate line GL1 among gate lines GL1 through GLn and is connected to a corresponding data line DL1 among data lines DL1 through DLm. Liquid crystal capacitor 16 and storage capacitor 18 are connected to TFT 14.

Timing controller 20 receives image data DATA and an external control signal ECS from an external source. Timing controller 20 comprises a control signal processing unit 22 that generates a data control signal DCS and a gate control signal GCS based on external control signal ECS and provides data control signal DCS and gate control signal GCS to data driver 30 and gate driver 40, respectively. Timing controller 20 further comprises an image signal processing unit 100 that generates image compensation data DATA' by adjusting, or compensating, image data DATA and provides image compensation data DATA' to data driver 30.

Image signal processing unit 100 receives image data DATA comprising previous frame data D1 and current frame data D2. Previous frame data D1 is encoded and decoded in a first mode to produce previous frame decoding data. Current frame data D2 is encoded and decoded in a second mode to produce current frame decoding data. Image signal processing unit 100 sets one of a first effective range and a second effective range as a comparison range, wherein the first effective range corresponds to effective bits ensuring that an error is not in the data encoded and decoded in the first mode, and the second effective range corresponds to effective bits ensuring that an error is not in the data encoded and decoded in the second mode.

Image signal processing unit 100 compares the previous frame decoding data and the current frame decoding data within the comparison range. Based on the comparison, image signal processing unit 100 determines whether current frame data D2 is a moving picture or a still image. Where current frame data D2 is determined to be a moving picture, image signal processing unit 100 compensates current frame data D2 and outputs the compensated current frame data so as to improve a response time. However, where current frame data D2 is determined to be a still image, image signal processing unit 100 outputs current frame data D2 without compensation.

Image signal processing unit 100 may also generate comparison frame filtering data by filtering the previous frame decoding data. Where it is determined that current frame data D2 is a still image, it is not necessary to compensate current frame data D2. However, if it is determined that current frame data D2 is a moving picture, image signal processing unit 100 compensates current frame data D2 based on current frame data D2 and the comparison frame filtering data, and it outputs the compensated current frame data.

Data driver 30 converts image compensation data DATA' received from timing controller 20 into an analogue data voltage using data control signal DCS, and provides the analogue data voltage to data lines DL1 through DLm of liquid crystal panel 10.

Gate driver 40 generates gate signals using gate control signal GCS, and respectively provides the gate signals to gate lines GL1 through GLn.

Figure 2:
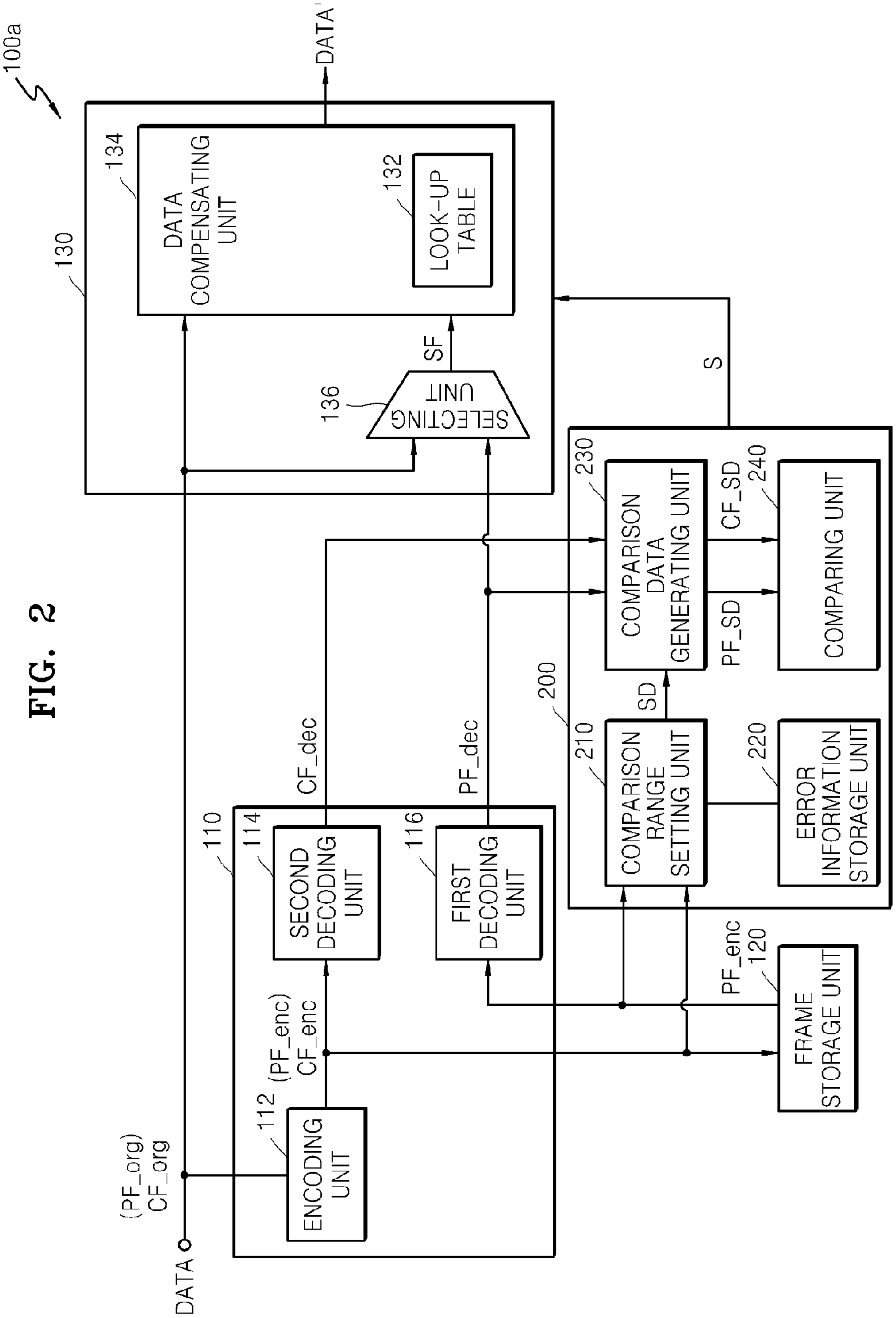
FIG. 2 is a block diagram of an image signal processing unit of an LCD device according to an embodiment of the inventive concept.

FIG. 2 is a block diagram of an image signal processing unit 100*a* according to an embodiment of the inventive concept. This embodiment represents one example of image signal processing unit 100 of LCD device 1.

Referring to FIG. 2, image signal processing unit 100*a* comprises an encoding/decoding unit 110, a frame storage unit 120, a determining unit 200, and a compensating unit 130.

Image signal processing unit 100*a* receives image data DATA from an external source. If image data DATA is data of a still image, image signal processing unit 100*a* does not compensate image data DATA, and it outputs image data DATA as image compensation data DATA'. However, if image data DATA is data of a moving picture, image signal processing unit 100*a* compensates image data DATA and outputs image compensation data DATA'.

Image data DATA comprises previous frame data PF_org and current frame data CF_org that have a difference of one frame. Previous frame data PF_org and current frame data CF_org may be whole data of consecutive two frames. For example, it may be data corresponding to all pixels of a liquid crystal panel. In another example, previous frame data PF_org and current frame data CF_org may be partial data of consecutive two frames, i.e., data corresponding to some pixels, e.g., 2×2, 2×3, or 3×3 pixels, or they may be data of specific pixels of consecutive two frames. In other examples, previous frame data PF_org and current frame data CF_org comprise multiple units of data corresponding to three colors, e.g., red (R), green (G), and blue (B). Pixels corresponding to previous frame data PF_org and pixels corresponding to current frame data CF_org are the same pixels in the liquid crystal panel.

Hereinafter, current frame data CF_org may be referred to as reference frame data, and previous frame data PF_org may be referred to as comparison frame data. In FIG. 2, previous frame data PF_org and previous frame encoding data PF_enc, which are enclosed by parentheses, are previously received and typically comprise as much as one frame.

For convenience of explanation, it may be assumed that each of previous frame data PF_org and current frame data CF_org is data corresponding to one pixel of a single color. However, the inventive concept is not limited thereto and thus each of previous frame data PF_org and current frame data CF_org may be data corresponding to three colors, or may be data corresponding to all pixels or some pixels of a frame. In certain contexts below, each of previous frame data PF_org and current frame data CF_org may be a group of multiple units of data which correspond to three (R, G, and B) colors in a single pixel.

Encoding/decoding unit 110 receives image data DATA comprising previous frame data PF_org and current frame data CF_org, and generates previous frame decoding data PF_dec and current frame decoding data CF_dec. Encoding/decoding unit 110 comprises an encoding unit 112, a first decoding unit 116, and a second decoding unit 114.

At an $n-1_{th}$ frame time, encoding unit 112 receives and encodes previous frame data PF_org, and then generates previous frame encoding data PF_enc. Previous frame encoding data PF_enc is stored in frame storage unit 120 for a time period of one frame.

At an $n_{th}$ frame time, encoding unit 112 receives current frame data CF_org. Encoding unit 112 encodes current frame data CF_org and then generates current frame encoding data CF_enc. Current frame encoding data CF_enc is decoded by second decoding unit 114 and then converted to the current frame decoding data CF_dec.

Previous frame encoding data PF_enc that is stored in frame storage unit 120 is decoded by first decoding unit 116 and then is converted to the previous frame decoding data PF_dec. Because previous frame encoding data PF_enc is stored in frame storage unit 120 for a time period of one frame, previous frame decoding data PF_dec and current frame decoding data CF_dec may be generated substantially at a same time.

Current frame encoding data CF_enc is also stored in frame storage unit 120 for a time period of one frame and is compared with next frame data (not shown) to be received at an $n+1_{th}$ frame time. A relationship between current frame data CF_org and the next frame data (not shown) is the same as a relationship between previous frame data PF_org and current frame data CF_org, and thus a description of the next frame data (not shown) will be omitted to avoid redundancy.

Encoding unit 112 performs encoding to decrease a size of current frame data CF_org. To allow comparison between whole pixel data of a current frame and whole pixel data of a previous frame, the whole pixel data of the previous frame is stored in frame storage unit 120. However, as the resolution of the liquid crystal panel increases, a size of a whole pixel data of one frame increases accordingly. Thus, frame storage unit 120 may require expansion to store the whole pixel data of one frame. However, where the capacity of frame storage unit 120 is increased, the manufacturing costs are also increased. To address this problem, encoding unit 112 may perform encoding, e.g., compression, to decrease an amount of data to be stored in frame storage unit 120.

Encoding unit 112 can perform encoding in various encoding modes. In one encoding mode, for example, predetermined lower bits of data may be removed. In another encoding mode, only a difference value from adjacent data may be stored. In yet another encoding mode, the number of lower bits to be removed may be adjusted according to a data value. Where current frame data CF_org comprises first color (e.g., red) data, second color (e.g., green) data, and third color (e.g., blue) data, according to the encoding modes, three lower bits may be removed with respect to the second color data, and four lower bits may be removed with respect to the first color data and the third color data. Where data is decoded after an encoding process, some information of the data may be lost, or the decoded data may include an error. Also, according to the encoding modes, an amount of lost information may vary.

FIG. 3 illustrates examples of the encoding modes of encoding unit 112. For instance, FIG. 3 illustrates encoding modes that can be used to encode image data comprising red color data, green color data, and blue color data. In the examples of FIG. 3, the red color data, the green color data, and the blue color data are 8-bit data.

More specifically, FIG. 3 illustrates mode information, effective bits, and error information that correspond to different encoding modes of encoding unit 112. The mode information is included in encoded data to allow a decoding unit to recognize an encoding mode of the encoded data. Where encoding and decoding are performed in each encoding mode, the effective bits are the bits that are the same after the encoding and the decoding are performed. For example, where 8 bits are encoded and decoded, and two lower bits are removed through this process, the remaining 6 bits are deemed to be effective bits.

In an effective bit section of FIG. 3, effective bits are labelled with corresponding bit numbers. Error information, as distinct from effective bits, indicates the number of bits among decoded data that may have an error. In the example where there are six effective bits, the error information is 2. An effective range may be calculated based on the effective bits and the error information. Also, the effective range may be a portion corresponding to the effective bits from among all bits of data. The effective range may also be expressed as a value obtained by subtracting a value of the error information from the number of all bits of the data. That is, in the above case where the data is 8 bits and the error information is 2, the effective range can be expressed as 6.

Although a mode and a sub-mode are separately illustrated in FIG. 3, the mode and the sub-mode can be referred to as an encoding mode. The mode and the sub-mode of FIG. 3 are examples and do not limit the inventive concept.

The encoding mode performed by encoding unit 112 varies according to data to be encoded. For example, where a data value is close to 0 or close to a maximum value (e.g., if the data is 8-bit, the maximum value is 255), the data value may be unrecognizable to human eyes, so lower bits may be removed. Also, where a current frame data value and an adjacent frame data value are similar to each other, a difference between two units of adjacent data may be stored by using a small number of bits.

Where current frame data CF_org is a group of multiple units of 2×2 pixel data, the encoding mode may vary according to a disposition of the 2×2 pixel data. For example, where values of the units of 2×2 pixel data are the same, the values are the same in a vertical direction, the values are the same in a horizontal direction, or the values are the same except for one, patterns of these cases may be defined as encoding modes, respectively.

After data is encoded and decoded according to all of the encoding modes, the data before encoding may be compared with multiple units of encoded and decoded data, and then an encoding mode may be automatically selected according to a predetermined rule, in consideration of a size of the encoded data and a size of an error.

Thus, an encoding mode in which current frame data CF_org is encoded may be different from an encoding mode in which previous frame data PF_org is encoded. Hereinafter, the encoding mode in which previous frame data PF_org is encoded is referred to as a first mode, and the encoding mode in which current frame data CF_org is encoded is referred to as a second mode.

Previous frame encoding data PF_enc and current frame encoding data CF_enc comprises first mode information indicating the first mode, and second mode information indicating the second mode, respectively.

Second decoding unit 114 receives current frame encoding data CF_enc and then extracts the second mode information indicating a mode in which current frame encoding data CF_enc is encoded. Afterward, current frame encoding data CF_enc is decoded according to the second mode information. As a result, second decoding unit 114 generates current frame decoding data CF_dec. As described above, current frame decoding data CF_dec comprises an error of current frame data CF_org.

First decoding unit 116 receives previous frame encoding data PF_enc from frame storage unit 120 and extracts the first mode information indicating a mode in which previous frame encoding data PF_enc is encoded. Afterward, previous frame encoding data PF_enc is decoded according to the first mode information. As a result, second decoding unit 114 generates previous frame decoding data PF_dec.

Determining unit 200 receives previous frame encoding data PF_enc, current frame encoding data CF_enc, previous frame decoding data PF_dec, and current frame decoding data CF_dec, and determines whether previous frame data PF_org and current frame data CF_org are equal to each other. By doing so, determining unit 200 determines whether current frame data CF_org is a moving picture or a still image. Determining unit 200 provides a determination result S to compensating unit 130. Determining unit 200 comprises a comparison range setting unit 210, an error information storage unit 220, a comparison data generating unit 230, and a comparing unit 240.

Comparison range setting unit 210 receives previous frame encoding data PF_enc and current frame encoding data CF_enc, and it extracts the first mode information and the second mode information from the received data. Comparison range setting unit 210 refers to the effective bits or the error information based on the encoding mode stored in error information storage unit 220, and then it sets a comparison range in which the previous frame decoding data PF_dec and the current frame decoding data CF_dec are to be compared. Comparison range setting unit 210 generates effective data SD corresponding to the comparison range. The comparison range is an effective range with respect to the first mode or an effective range with respect to the second mode. For example, the comparison range may be a smaller effective range from among the effective range with respect to the first mode and the effective range with respect to the second mode.

Error information storage unit 220 stores mode information and effective bits or error information for each encoding mode. For example, error information storage unit 220 can stores the mode information and the effective bits or error information of FIG. 3.

Comparison data generating unit 230 receives effective data SD, previous frame decoding data PF_dec, and current frame decoding data CF_dec, and it generates previous frame comparison data PF_SD and current frame comparison data CF_SD. Comparing unit 240 receives and compares previous frame comparison data PF_SD and current frame comparison data CF_SD, and then it generates the signal S indicating whether previous frame comparison data PF_SD and current frame comparison data CF_SD are the same. For example, where previous frame comparison data PF_SD and current frame comparison data CF_SD are the same, S may be logic '0', and where previous frame comparison data PF_SD and current frame comparison data CF_SD are different, S may be logic '1'.

Compensating unit 130 receives current frame data CF_org and previous frame decoding data PF_dec, and it outputs compensation data DATA'. Compensating unit 130 comprises a look-up table 132, a data compensating unit 134, and a selecting unit 136.

Where the signal S is logic '0', it indicates that current frame data CF_org is a still image, so compensating unit 130 outputs current frame data CF_org without compensation. However, where the signal S is logic '1', it indicates that current frame data CF_org is a moving picture, so compensating unit 130 compensates current frame data CF_org and outputs the compensated current frame data as image compensation data DATA'. To compensate current frame data CF_org, compensating unit 130 refers to look-up table 132.

Look-up table 132 stores compensation data for previous data and current data. In general, if a value of the current data is greater than a value of the previous data, the compensation data has a value greater than the current data. Conversely, if the value of the current data is less than the value of the previous data, the compensation data has a value less than the current data. If the previous data and the current data are the same, the compensation data is the same as the current data.

For example, where the number of frames per second is 50 fps, a time period for displaying one frame is 20 ms. In this regard, a response time of the liquid crystal panel may be decreased in a manner that a voltage corresponding to the compensation data is applied to a pixel of the liquid crystal panel during a time period from 0 ms to 10 ms, and a voltage corresponding to the current data is applied to the liquid crystal panel during a time period from 10 ms to 20 ms.

For example, where the value of the previous data is 0, and the value of the current data is 48, the value of the compensation data may be 155. By applying a voltage corresponding to the value of the compensation data, i.e., 155, to a pixel during a time period from 0 ms to 10 ms, liquid crystal capacitor 16 (refer to FIG. 1) and storage capacitor 18 (refer to FIG. 1) of the pixel may be rapidly charged. However, at 10 ms, the voltage charged in liquid crystal capacitor 16 and storage capacitor 18 may be less than a voltage corresponding to the value of the current data, i.e., 48. Afterward, during a time period from 10 ms to 20 ms, the voltage corresponding to the value of the current data, i.e., 48, is applied to the pixel, so that the pixel may emit light corresponding to the current data.

In the embodiment of FIG. 2, compensating unit 130 comprises selecting unit 136 and data compensating unit 134. According to the signal S, selecting unit 136 outputs current frame data CF_org or previous frame decoding data PF_dec as selection data SF. For example, where the signal S is logic '0', selecting unit 136 outputs current frame data CF_org, and where the signal S is logic '1', selecting unit 136 outputs the previous frame decoding data PF_dec.

Data compensating unit 134 receives current frame data CF_org and selection data SF. Here, selection data SF is regarded as previous frame decoding data PF_dec. Data compensating unit 134 refers to look-up table 132 and then outputs current frame compensation data corresponding to current frame data CF_org and selection data SF. Compensation data DATA' includes the current frame compensation data.

Image signal processing unit 100*a* decreases the noise in current frame data CF_org, or previous frame data PF_org is displayed on a screen. In general, noise is frequently incurred in a process of quantizing an analogue signal into a digital signal. Due to the noise, although previous frame data PF_org and current frame data CF_org are the same, current frame data CF_org may be determined as a moving picture.

Also, although the quantization noise has a relatively very small value, the quantization noise may be amplified during an encoding process. For example, where previous frame data PF_org and current frame data CF_org are exactly the same, they are encoded and decoded in the same encoding mode. However, previous frame data PF_org and current frame data CF_org that become different from each other due to the noise may be encoded and decoded in different encoding modes. Also, because they are encoded and decoded in the different encoding modes, a difference between previous frame decoding data PF_decand current frame decoding data CF_dec may increase. As a result, current frame data CF_org may be determined as a moving picture.

However, image signal processing unit 100*a* sets different comparison ranges according to the encoding modes so that, although noise is in current frame data CF_org or previous frame data PF_org, image signal processing unit 100*a* may correctly determine whether current frame data CF_org is a moving picture, i.e., whether to perform a compensation operation. Thus, it is possible to prevent unnecessary data compensation from being performed due to the noise.

Figure 4:
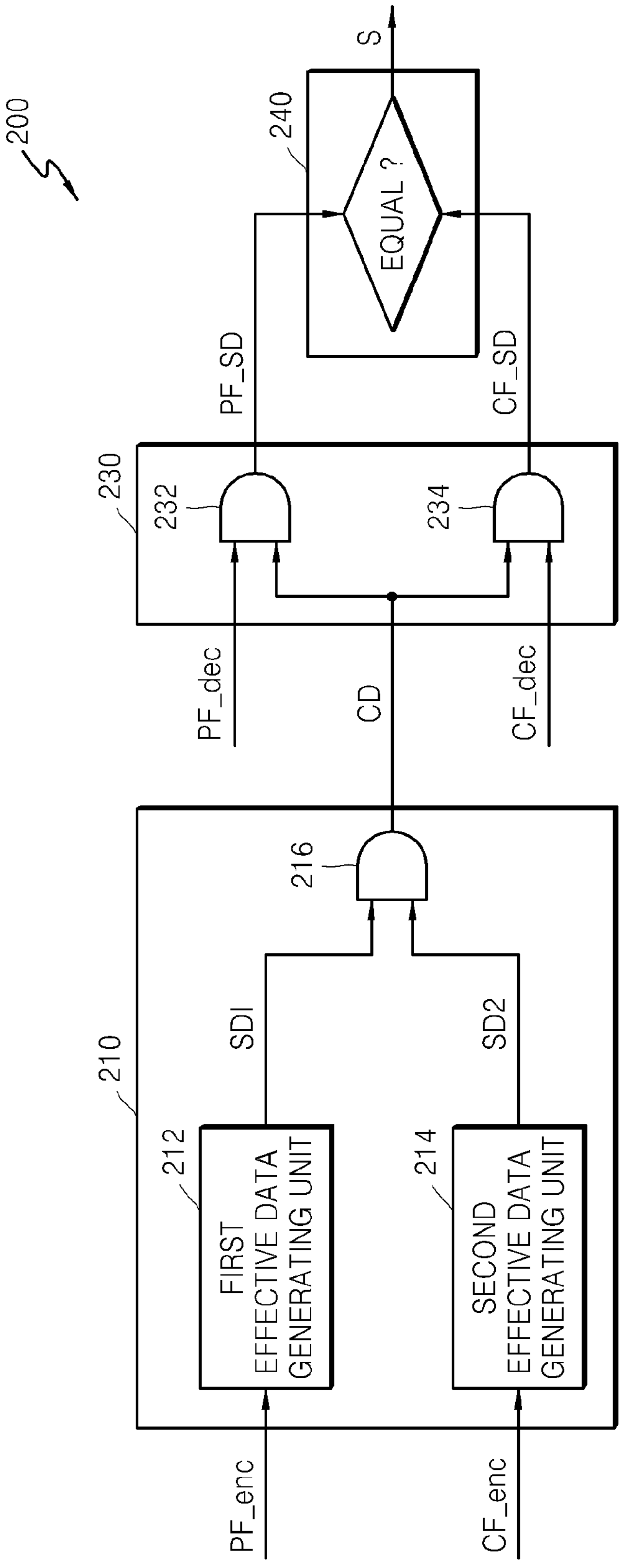
FIG. 4 is a block diagram of a determining unit of FIG. 2 according to an embodiment of the inventive concept.

FIG. 4 is a block diagram illustrating an example of determining unit 200 of FIG. 2 according to an embodiment of the inventive concept.

Referring to FIG. 4, determining unit 200 comprises comparison range setting unit 210, comparison data generating unit 230, and comparing unit 240. Error information storage unit 220 illustrated in FIG. 2 is not illustrated in FIG. 4. However, error information storage unit 220 may store mode information and effective bits for each of encoding modes.

Comparison range setting unit 210 comprises a first effective data generating unit 212 and a second effective data generating unit 214.

First effective data generating unit 212 receives previous frame encoding data PF_enc and extracts first mode information in the previous frame encoding data PF_enc. First effective data generating unit 212 refers to the effective bits stored in error information storage unit 220 and then generates first effective data SD1 corresponding to the first mode information.

Second effective data generating unit 214 receives current frame encoding data CF_enc, extracts second mode information in the current frame encoding data CF_enc, and generates second effective data SD2 corresponding to the second mode information.

For example, referring to FIG. 3, where the first mode information is 0100 xxx, first effective data SD1 may be 1111 1000(R) 1111 1000(G) 1111 1000(B). Also, where the second mode information is 1101 01x, second effective data SD2 may be 1111 0000(R) 1111 1000(G) 1111 0000(B). Here, it is assumed that previous frame data PF_org and current frame data CF_org include multiple units of data corresponding to three colors, respectively, and each of the units of data corresponding to three colors is 8 bits. Thus, a total number of bits of each of previous frame data PF_org and current frame data CF_org is 24 bits.

Comparison range setting unit 210 comprises a first logic unit 216 that performs an AND operation on bits of first effective data SD1, and bits of second effective data SD2. First logic unit 216 receives first effective data SD1 and second effective data SD2, and then generates comparison data CD. In the above example, comparison data CD is 1111 0000(R) 1111 1000(G) 1111 0000(B). Comparison data CD indicates a comparison range in which bits of previous frame decoding data PF_dec and bits of current frame decoding data CF_dec are compared with each other. Also, comparison data CD corresponds to effective data SD of FIG. 2.

Comparison data generating unit 230 comprises a second logic unit 232 and a third logic unit 234, wherein second logic unit 232 performs an AND operation on bits of comparison data CD and the bits of previous frame decoding data PF_dec, and third logic unit 234 performs an AND operation on the bits of comparison data CD and the bits of current frame decoding data CF_dec.

Second logic unit 232 generates previous frame comparison data PF_SD. In the aforementioned example, previous frame comparison data PF_SD is obtained by masking lower 4 bits of first data R, lower 3 bits of second data G, and lower 4 bits of third data B, which are of the previous frame decoding data PF_dec.

Also, third logic unit 234 generates current frame comparison data CF_SD. In the above example, current frame comparison data CF_SD may be obtained by masking lower 4 bits of first data R, lower 3 bits of second data G, and lower 4 bits of third data B, which are of current frame decoding data CF_dec.

Comparing unit 240 determines whether previous frame comparison data PF_SD and the current frame comparison data CF_SD are the same.

Thus, for example, due to quantization noise or an encoding error, lower 4 bits of first data R, lower 3 bits of second data G, and lower 4 bits of third data B, which are among previous frame decoding data PF_dec, may be different from lower 4 bits of first data R, lower 3 bits of second data G, and lower 4 bits of third data B, which are among current frame decoding data CF_dec.

In this case, determining unit 200 sets a comparison range according to an encoding mode and compares previous frame decoding data PF_dec and current frame decoding data CF_dec only within the comparison range so that determining unit 200 determines that previous frame decoding data PF_dec and current frame data CF_org are the same. That is, determining unit 200 determines that current frame data CF_org is a still image. Accordingly, it is possible to prevent unnecessary data compensation being performed due to the quantization noise or the encoding error.

Figure 5:
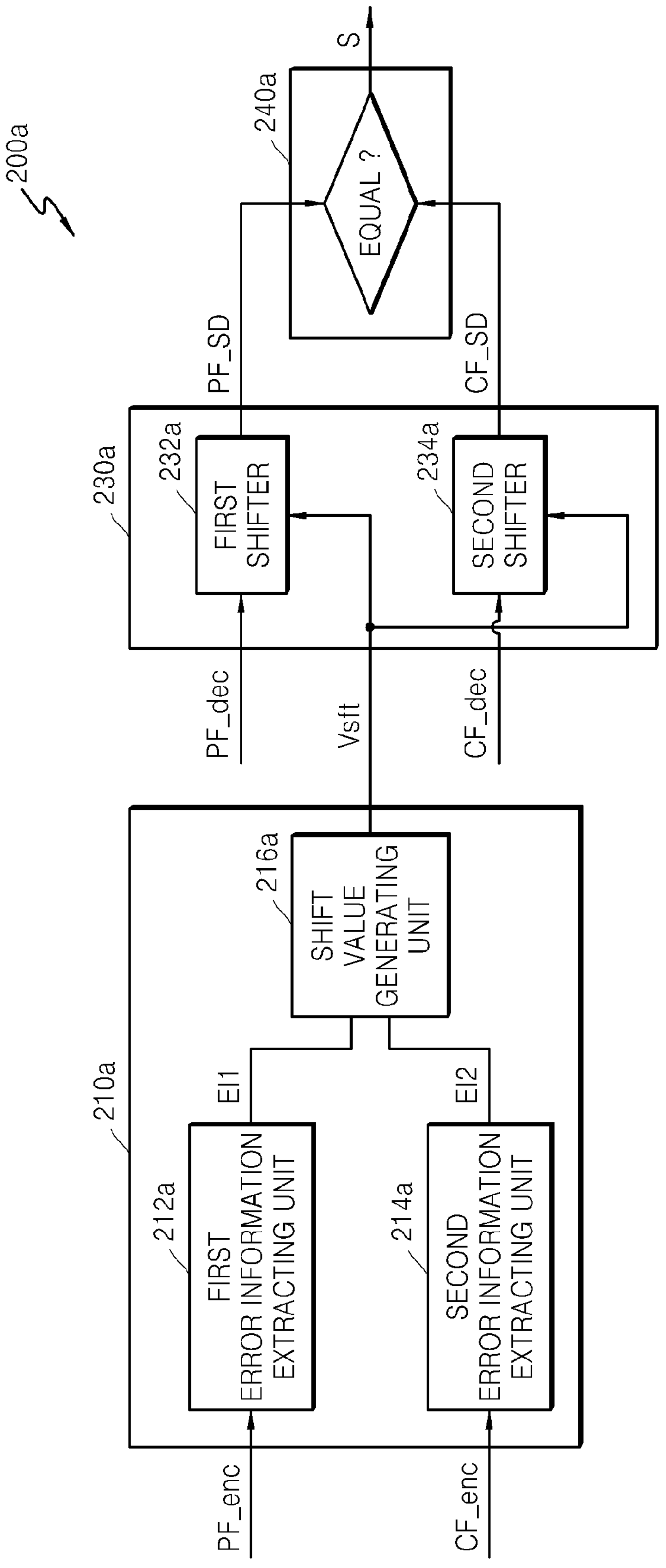
FIG. 5 is a block diagram of the determining unit of FIG. 2 according to another embodiment of the inventive concept.

FIG. 5 is a block diagram illustrating a determining unit 200*a* according to an embodiment of the inventive concept. This embodiment represents another example of determining unit 200 of FIG. 2.

Referring to FIG. 5, determining unit 200*a* comprises a comparison range setting unit 210*a*, a comparison data generating unit 230*a*, and a comparing unit 240*a*. Error information storage unit 220 of FIG. 2 is not illustrated in FIG. 5. However, error information storage unit 220 may store mode information and effective bits for each of encoding modes.

Comparison range setting unit 210*a* comprises a first error information extracting unit 212*a* and a second error information extracting unit 214*a*.

First error information extracting unit 212*a* receives previous frame encoding data PF_enc and extracts first mode information in previous frame encoding data PF_enc. First error information extracting unit 212*a* refers to error information stored in error information storage unit 220 and then extracts first error information EI1 corresponding to the first mode information.

Second error information extracting unit 214*a* receives current frame encoding data CF_enc, extracts second mode information in current frame encoding data CF_enc, and extracts second error information EI2 corresponding to the second mode information.

For example, referring to FIG. 3, where first mode information is 0100 xxx, first error information EI1 may be 3(R), 3(G), and 3(B). Also, where the second mode information is 1101 01x, second error information EI2 may be 4(R), 3(G), and 4(B). Here, it is assumed that previous frame data PF_org and current frame data CF_org comprise multiple units of data corresponding to three colors, respectively, and each of the units of data corresponding to three colors is 8 bits. Thus, a total of previous frame data PF_org and current frame data CF_org is 24 bits. Also, a total of a previous frame decoding data PF_dec and a current frame decoding data CF_dec is 24 bits.

Comparison range setting unit 210*a* comprises a shift value generating unit 216*a* that generates a shift value Vsft, which is a greater value among a value of first error information EI1 and second error information EI2. In the above example, shift value Vsft may be, for instance, 4(R), 3(G), and 4(B). Shift value Vsft corresponds to a comparison range in which previous frame decoding data PF_dec and current frame decoding data CF_dec are to be compared, or to effective data SD of FIG. 2.

Comparison data generating unit 230*a* comprises a first shifter 232*a* that shifts previous frame decoding data PF_dec by as much as shift value Vsft, and a second shifter 234*a* that shifts current frame decoding data CF_dec by as much as shift value Vsft.

In the above example, first shifter 232*a* generates a previous frame shift data PF_sft by shifting a first data (R) by as much as 4 bits, shifting a second data (G) by as much as 3 bits, and shifting a third data (B) by as much as 4 bits, wherein the first, second, and third data (R), (G), and (B) are among previous frame decoding data PF_dec. Previous frame shift data PF_sft comprises first data (R) of 4 bits, second data (G) of 5 bits, and third data (B) of 4 bits.

Second shifter 234*a* generates a current frame shift data CF_sft by shifting a first data (R) by as much as 4 bits, by shifting a second data (G) by as much as 3 bits, and by shifting a third data (B) by as much as 4 bits, wherein the first, second, and third data (R), (G), and (B) are among current frame decoding data CF_dec. Current frame shift data CF_sft comprises the first data (R) of 4 bits, the second data (G) of 5 bits, and the third data (B) of 4 bits.

Comparing unit 240*a* determines whether previous frame shift data PF_sft and current frame shift data CF_sft are equal to each other. For example, although previous frame data PF_org and current frame data CF_org are equal to each other, due to quantization noise or an encoding error, lower 4 bits of the first data (R), lower 3 bits of the second data (G), and lower 3 bits of the third data (B) of the previous frame decoding data PF_dec may become different from lower 4 bits of the first data (R), lower 3 bits of the second data (G), and lower 3 bits of the third data (B) of the current frame decoding data CF_dec. However, by performing the shifting operation, lower 4 bits of the first data (R), lower 3 bits of the second data (G), and lower 3 bits of the third data (B) of the previous frame decoding data PF_dec, and lower 4 bits of the first data (R), lower 3 bits of the second data (G), and lower 3 bits of the third data (B) of the current frame decoding data CF_dec do not remain in the previous frame shift data PF_sft and the current frame shift data CF_sft, so that comparing unit 240*a* may determine that the previous frame shift data PF_sft and the current frame shift data CF_sft are equal to each other. Accordingly, it is possible to prevent unnecessary data compensation being performed due to the quantization noise or the encoding error.

Figure 6:
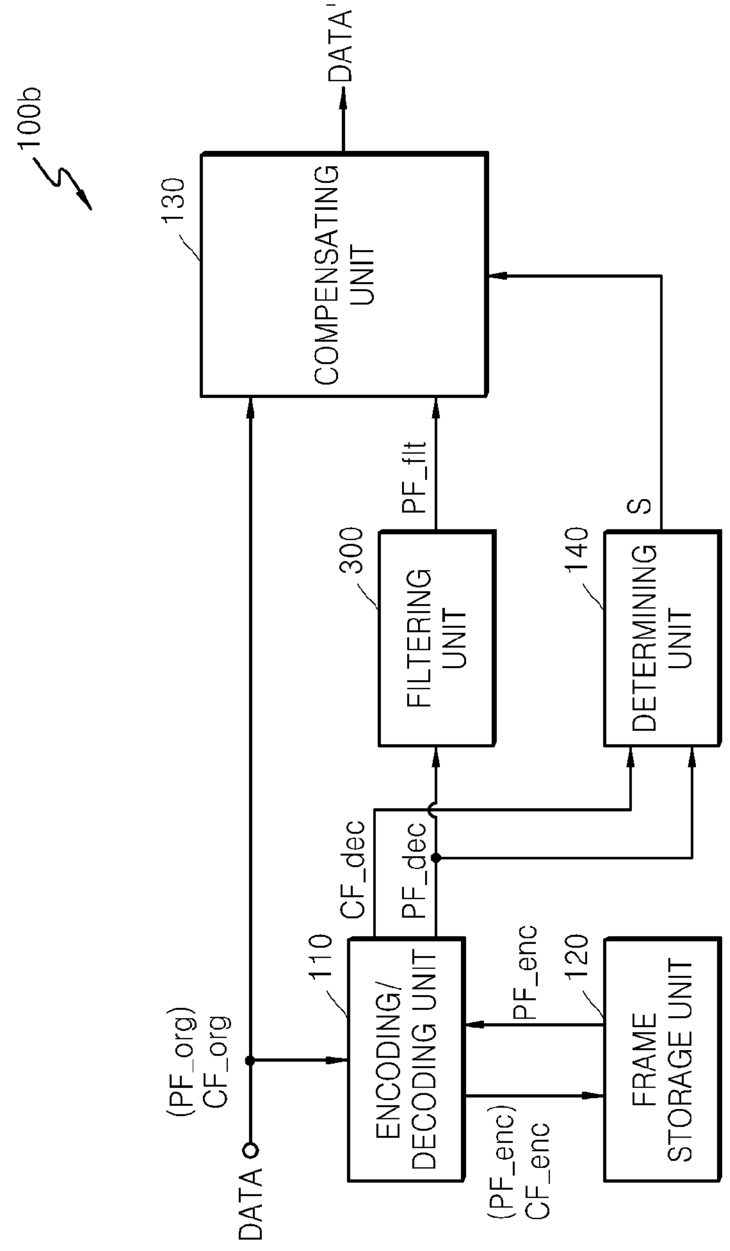
FIG. 6 is a block diagram of an image signal processing unit of an LCD device according to another embodiment of the inventive concept.

FIG. 6 is a block diagram of an image signal processing unit 100*b* of an LCD device, according to an embodiment of the inventive concept. This embodiment represents another example of image signal processing unit 100 of FIG. 1.

Referring to FIG. 6, image signal processing unit 100*b* comprises encoding/decoding unit 110, frame storage unit 120, determining unit 140, a filtering unit 300, and compensating unit 130. Because encoding/decoding unit 110, frame storage unit 120, and compensating unit 130 are described above with reference to FIG. 2, further descriptions of these features will be omitted to avoid redundancy. Hereinafter, parts of image signal processing unit 100*b* that are different from parts of image signal processing unit 100*a* of FIG. 2 will be described.

In the description that follows, it is assumed that previous frame data PF_org and current frame data CF_org correspond to two pixels. However, the inventive concept is not limited to this number of pixels, and previous frame data PF_org and current frame data CF_org may correspond to other numbers of pixels, e.g., 2×2, 2×3, or 3×3 pixels.

Filtering unit 300 provides previous frame filtering data PF_flt to compensating unit 130 by filtering previous frame decoding data PF_dec. Deviation values of data values in previous frame filtering data PF_flt may be decreased compared to those of data values in previous frame decoding data PF_dec.

Determining unit 140 determines whether previous frame decoding data PF_dec and current frame decoding data CF_dec are the same, and provides a determination result S to compensating unit 130.

Where determination result S indicates that previous frame decoding data PF_dec and current frame decoding data CF_dec are not the same, compensating unit 130 compensates current frame data CF_org based on current frame data CF_org and previous frame filtering data PF_flt, and outputs current frame compensation data. The current frame compensation data corresponding to current frame data CF_org and previous frame filtering data PF_flt is defined in look-up table 132 of FIG. 2. Where determination result S indicates that previous frame decoding data PF_dec and current frame decoding data CF_dec are the same, compensating unit 130 outputs current frame data CF_org without compensating it. The current frame compensation data may be included in image compensation data DATA'.

FIG. 7 illustrates an example of previous frame filtering data PF_flt filtered by filtering unit 300 of FIG. 6.

Referring to FIGS. 6 and 7, an original data value of each of first through third pixels in a first frame is 15, and an original data value of each of fourth through sixth pixels in the first frame is 127. Also, an original data value of each of first through fourth pixels in a second frame is 15, and an original data value of each of fifth through sixth pixels in the second frame is 127. Similarly, in a third frame and a fourth frame, a pixel having an original data value of 127 is shifted one by one in a right direction.

In this case, a decoding data value of each of the first and second pixels in the first frame is 15, which is the same as the original data value. The reason why an error does not occur is that encoding and decoding are performed by a unit comprised of two units of pixel data, and the original data values of the first and second pixels in an encoding unit are equal to each other. An encoding mode in this case may indicate that data values of pixels in the encoding unit are equal to each other.

However, a decoding data value of the third pixel is 0, and a decoding data value of the fourth pixel is 112. Because the original data values of the third and fourth pixels are different from each other, an error may have occurred in the encoding and decoding. Thus, encoding may be performed to remove lower 4 bits of the third and fourth pixels. Errors of the third and fourth pixels are 15. Again, decoding data values of the fifth and sixth pixels may be 127, which is the same as the original data value.

In the second frame, the original data values of the first and second pixels, the original data values of the third and fourth pixels, and the original data values of the fifth and sixth pixels are equal to each other so that encoding and decoding may be performed without an error. The third frame may be encoded and decoded in a similar manner to the first frame, and the fourth frame may be encoded and decoded in a similar manner to the second frame.

If filtering unit 300 is omitted, an operation of compensating unit 130 is performed based on previous frame decoding data PF_dec and current frame data CF_org. In general, the response time of compensating unit 130 is proportional to a difference between current frame data CF_org and the previous frame decoding data PF_dec. Thus, the fourth pixel of the second frame has a response time proportional to 97, which is a difference between the original data value (i.e., 15) of the second frame and the decoding data value (i.e., 112) of the first frame. On the other hand, the fifth pixel of the third frame has a response time proportional to 112, which is a difference between the original data value (i.e., 15) of the third frame and the decoding data value (i.e., 127) of the second frame. Similarly, the sixth pixel of the fourth frame has a response time that is proportional to 97. Thus, the response times significantly vary as values that are proportional to 97, 127, and 97, and a pixel shaking problem may arise.

However, where filtering unit 300 provides previous frame filtering data PF_flt to compensating unit 130, the pixel shaking problem tends to decrease. For example, in the first frame, a filtering data value of the second pixel becomes 13, which is decreased by as much as 2 compared to the decoding data value of the second pixel. Also, a filtering data value of the fifth pixel becomes 125, which is decreased by as much as 2, compared to the decoding data value of the fifth pixel. However, a filtering data value of the third pixel becomes 16, and a filtering data value of the fourth pixel becomes 120.

In the second frame, a filtering data value of the fourth pixel becomes 29, and a filtering data value of the fifth pixel becomes 123. In the third frame, similar to the first frame, a filtering data value of the fourth pixel becomes 13, a filtering data value of the fifth pixel becomes 16, and a filtering data value of a sixth pixel becomes 120.

Where filtering unit 300 is included in image signal processing unit 100, the fourth pixel of the second frame has a response time proportional to 105, which is a difference between the original data value (i.e., 15) of the second frame and the filtering data value (i.e., 120) of the first frame. On the other hand, the fifth pixel of the third frame has a response time proportional to 108, which is a difference between the original data value (i.e., 15) of the third frame and the filtering data value (i.e., 123) of the second frame. Similarly, the sixth pixel of the fourth frame has a response time that is proportional to 105. Thus, the response time is almost constant at values that are proportional to 105, 108, and 105, and the pixel shaking problem may be significantly reduced.

Figure 8:
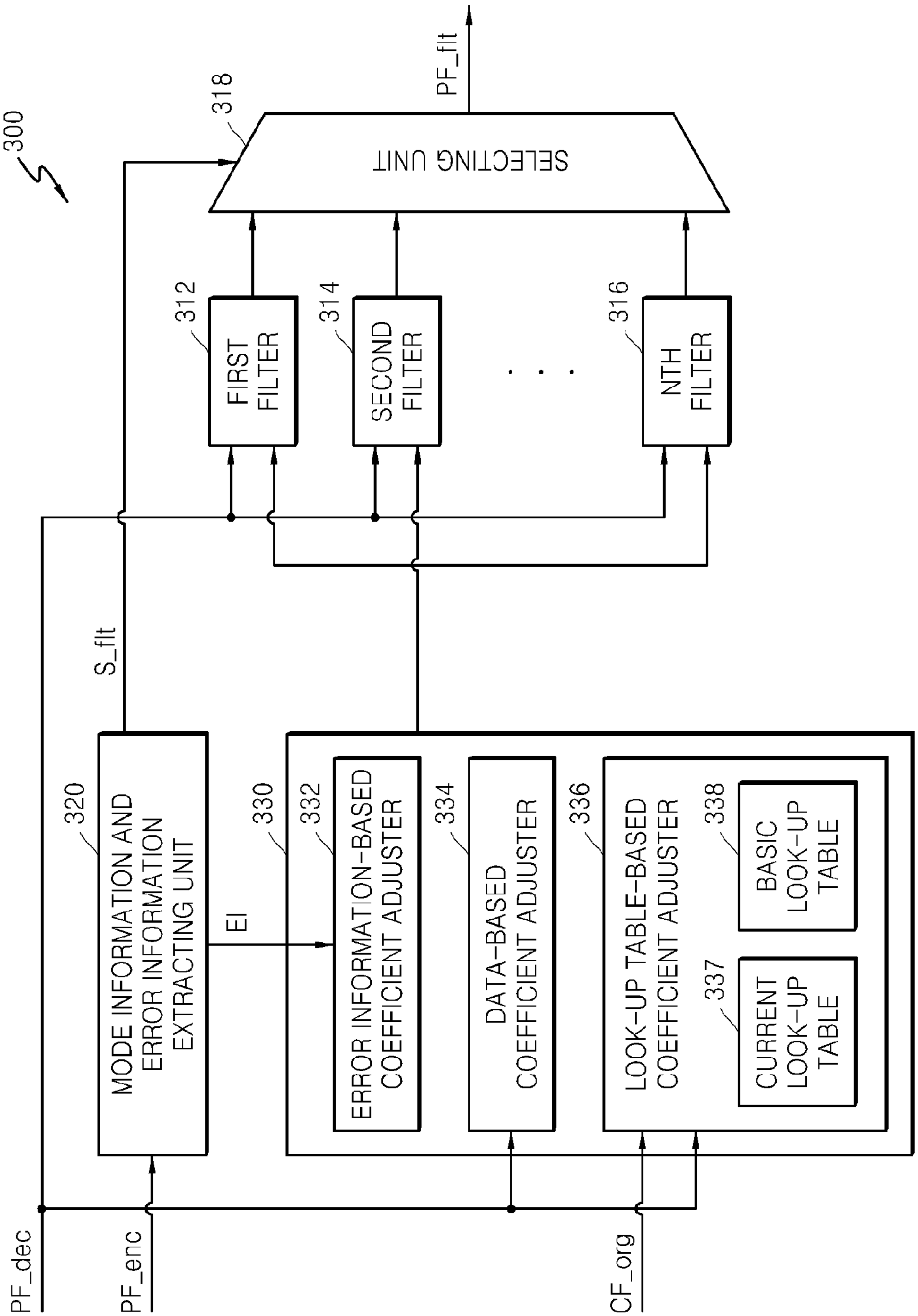
FIG. 8 is a block diagram of a filtering unit in the image signal processing unit of FIG. 6.

FIG. 8 is a block diagram of filtering unit 300 in image signal processing unit 100*b* of FIG. 6.

Referring to FIG. 8, filtering unit 300 comprises one or more filters 312, 314, and 316, and a selecting unit 318 for selecting one of these filters. Filtering unit 300 further comprises a mode and error information extracting unit 320 (M/E extracting unit 320) and a coefficient adjusting unit 330. Coefficient adjusting unit 330 comprises an error information-based coefficient adjuster 332, a data-based coefficient adjuster 334, and a look-up table-based coefficient adjuster 336. Look-up table-based coefficient adjuster 336 comprises a basic look-up table 338 and a current look-up table 337.

Filters 312, 314, and 316 can be spatial filters for filtering previous frame decoding data PF_dec, and they may have different sizes or shapes. For example, first filter 312 may have a 2×3 size, second filter 314 may have a 3×3 size, and $n_{th}$ filter 316 may have a cross-shape. For explanation purposes, it will be assumed that all of the filters 312, 314, and 316 have the same 2×3 size. Examples of filters 312, 314, and 316 are illustrated in FIGS. 9A through 9C.

Figure 9A:
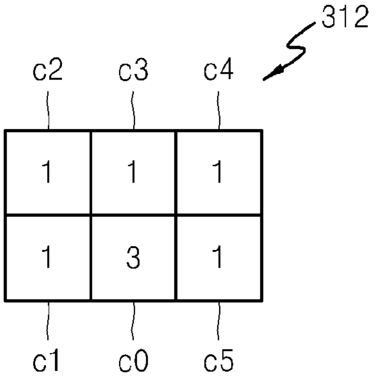
FIGS. 9A through 9C illustrate examples of filters of FIG. 8.
Figure 9B:
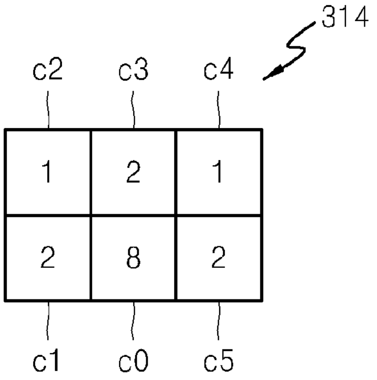
Figure 9C:
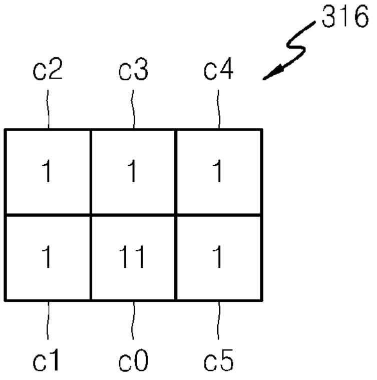

Referring to FIGS. 9A through 9C, each of filters 312, 314, and 316 has a central coefficient c0 positioned at a center of a lower row, and neighboring coefficients c1 through c5 surrounding central coefficient c0. Central coefficient c0 is a coefficient by which filtering pixel data whose value is changed by filtering is to be multiplied, and the neighboring coefficients c1 through c5 are to be multiplied by multiple units of neighboring pixel data, respectively, that are adjacent to the filtering pixel data. The value of the filtering pixel data is obtained by adding a multiplication value of the filtering pixel data before filtering and the central coefficient c0 to a multiplication value of the units of neighboring pixel data corresponding to the neighboring coefficients c1 through c5, and then dividing the sum of the addition by the sum of the neighboring coefficients c1 through c5. To perform filtering using filters 312, 314, and 316, previous frame decoding data PF_dec and previous frame data PF_org may include not only the filtering pixel data but also the units of neighboring pixel data.

First filter 312 can be, for instance, a low pass filter. Central coefficient c0 of first filter 312 may be 3, and neighboring coefficients c1 through c5 may be 1. Second filter 314 may be a Gaussian filter. Central coefficient c0 of second filter 314 may be 8, some neighboring coefficients c1, c3, and c5 may be 2, and residual neighboring coefficients c2 and c4 may be 1. The $n_{th}$ filter 316 may be a minimum filter, and its central coefficient c0 may be 11 and its neighboring coefficients c1 through c5 may be 1.

The coefficients of filters 312, 314, and 316 may be optimized by repeating a test. Also, the coefficients of filters 312, 314, and 316 may be optimized with respect to the basic look-up table 338, which is random. If compensating unit 130 of FIG. 6 uses another look-up table, it is necessary to change the coefficients of filters 312, 314, and 316, as described in further detail below.

M/E extracting unit 320 receives previous frame encoding data PF_enc and extracts information about an encoding mode, i.e., first mode information. M/E extracting unit 320 refers to error information storage unit 220 of FIG. 2 and then extracts error information corresponding to a first mode.

Filters 312, 314, and 316 may be optimized while corresponding to encoding modes. For example, first filter 312 may be optimized to a first encoding mode, second filter 314 may be optimized to a second encoding mode, and $n_{th}$ filter 316 may be optimized to an $n_{th}$ encoding mode. In another example, filters 312, 314, and 316 may be optimized while corresponding to multiple units of error information. For example, the first encoding mode may be optimized for a case where error information is 4, the second encoding mode may be optimized for a case where error information is 5, and the $n_{th}$ encoding mode may be optimized for a case where error information is 6.

M/E extracting unit 320 generates a filter selection signal S_flt for selecting filters 312, 314, and 316 from mode or error information extracted from previous frame encoding data PF_enc. Filter selection signal S_flt is provided to selecting unit 318, which selects one of filters 312, 314, and 316 to filter previous frame decoding data PF_dec. Although M/E extracting unit 320 is described with respect to the error information, functions of M/E extracting unit 320 can also be performed with respect to effective bits.

Coefficient adjusting unit 330 adjusts central coefficients c0 and neighboring coefficients c1 through c5 of filters 312, 314, and 316.

As illustrated in FIG. 8, coefficient adjusting unit 330 comprises error information-based coefficient adjuster 332, data-based coefficient adjuster 334, and look-up table-based coefficient adjuster 336. However, it is not necessary for coefficient adjusting unit 330 to incorporate all of error information-based coefficient adjuster 332, data-based coefficient adjuster 334, and look-up table-based coefficient adjuster 336. In other words, some of these features may be omitted from coefficient adjusting unit 330.

Error information-based coefficient adjuster 332 determines whether or not to filter previous frame decoding data PF_dec based on error information about previous frame encoding data PF_enc. For example, where the error information is less than a predetermined reference value, error information-based coefficient adjuster 332 adjusts central coefficients c0 of filters 312, 314, and 316 to 1 and adjusts the neighboring coefficients c1 through c5 of filters 312, 314, and 316 to 0 so as not to filter previous frame decoding data PF_dec. Accordingly, previous frame decoding data PF_dec may be output as previous frame filtering data PF_flt. For example, the predetermined reference value may be 4. As illustrated in FIG. 7, the pixel shaking problem may arise due to encoding and decoding errors. However, when the errors are relatively small, the pixel shaking problem is reduced so that filtering may be omitted with respect to an encoding mode with a small error.

In another example, effective bits corresponding to an encoding mode may be extracted from M/E extracting unit 320. In this case, where an effective range corresponding to the effective bits is less than a predetermined reference effective range, error information-based coefficient adjuster 332 adjusts central coefficients c0 of filters 312, 314, and 316 to 1 and adjusts neighboring coefficients c1 through c5 of filters 312, 314, and 316 to 0.

Data-based coefficient adjuster 334 adjusts central coefficient c0, and neighboring coefficients c1 through c5 corresponding to the units of neighboring pixel data, based on a difference between the filtering pixel data and each of the units of neighboring pixel data. Here, it is assumed that a neighboring coefficient corresponding to one of the units of neighboring pixel data which is calculated with respect to its difference from the filtering pixel data is referred to as a corresponding neighboring coefficient cc, and a value of the corresponding neighboring coefficient cc is c. Data-based coefficient adjuster 334 divides the difference between the filtering pixel data and the neighboring pixel data into several blocks, and then adjusts coefficients c0 through c5.

In some examples, data-based coefficient adjuster 334 divides the difference between the filtering pixel data and the neighboring pixel data into three blocks and then adjusts coefficients c0 through c5. For example, if the difference between the filtering pixel data and the neighboring pixel data is less than 32, data-based coefficient adjuster 334 may not adjust central coefficient c0 and the corresponding neighboring coefficient cc. Where the difference between the filtering pixel data and the neighboring pixel data is greater than or equal to 32 and less than 64, data-based coefficient adjuster 334 may increase the central coefficient c0 by as much as c/2, and may reduce the corresponding neighboring coefficient cc by as much as c/2. Where the difference between the filtering pixel data and the neighboring pixel data is greater than or equal to 64, data-based coefficient adjuster 334 increases central coefficient c0 by as much as c, and adjusts the corresponding neighboring coefficient cc to 0.

In another example, data-based coefficient adjuster 334 divides the difference between the filtering pixel data and the neighboring pixel data into five blocks and then adjusts coefficients c0 through c5. For example, if the difference between the filtering pixel data and the neighboring pixel data is less than 32, data-based coefficient adjuster 334 does not adjust central coefficient c0 and the corresponding neighboring coefficient cc. If the difference between the filtering pixel data and the neighboring pixel data is greater than or equal to 32 and less than 96, data-based coefficient adjuster 334 increases central coefficient c0 by as much as c/4, and it reduces the corresponding neighboring coefficient cc by as much as c/4. If the difference between the filtering pixel data and the neighboring pixel data is greater than or equal to 96 and less than 160, data-based coefficient adjuster 334 increases central coefficient c0 by as much as c/2, and it reduces the corresponding neighboring coefficient cc by as much as c/2. If the difference between the filtering pixel data and the neighboring pixel data is greater than or equal to 160 and less than 224, data-based coefficient adjuster 334 increases central coefficient c0 by as much as 3c/4, and reduces the corresponding neighboring coefficient cc by as much as 3c/4.

If the difference between the filtering pixel data and the neighboring pixel data is greater than or equal to 224, data-based coefficient adjuster 334 increases central coefficient c0 by as much as c, and it adjusts the corresponding neighboring coefficient cc to 0.

Look-up table-based coefficient adjuster 336 comprises the basic look-up table 338 that is used to calculate the coefficients of filters 312, 314, and 316. Also, the look-up table-based coefficient adjuster 336 comprises or may access the current look-up table 337 that is actually used by image signal processing unit 100 of FIG. 2. The current look-up table 337 may be the same as the look-up table 132 in data compensating unit 134 of FIG. 2, and the look-up table-based coefficient adjuster 336 may access the look-up table 132 and then may obtain current frame compensation data. The look-up table-based coefficient adjuster 336 may receive current frame data CF_org and the previous frame decoding data PF_dec.

Look-up table-based coefficient adjuster 336 adjusts the number of filters 312, 314, and 316 according to the current look-up table 337. For example, look-up table-based coefficient adjuster 336 refers to basic look-up table 338 and then extracts basic compensation data corresponding to current frame data CF_org and previous frame decoding data PF_dec. Also, look-up table-based coefficient adjuster 336 refers to current look-up table 337 and then extracts actual compensation data corresponding to current frame data CF_org and previous frame decoding data PF_dec. Here, it is assumed that a value of previous frame decoding data PF_dec is D1, a value of current frame data CF_org is D2, a value of basic compensation data is D3, and a value of the actual compensation data is D4. A basic compensation ratio R1 can be defined as a ratio in which previous frame decoding data PF_dec is increased to the basic compensation data and current frame data CF_org, and it can be calculated by (D3−D1)/(D2−D1). An actual compensation ratio R2 can be defined as a ratio in which the previous frame decoding data PF_dec is increased to the actual compensation data and current frame data CF_org, and it can be calculated by (D4−D1)/(D2−D1).

Look-up table-based coefficient adjuster 336 calculates a weight w based on basic compensation ratio R1 and actual compensation ratio R2. Weight w can be defined as a ratio of basic compensation ratio R1 and actual compensation ratio R2, that is, R2/R1. Thus, weight w may be calculated by (D4−D1)/(D3−D1). Look-up table-based coefficient adjuster 336 adjusts coefficients c0 through c5 by multiplying or dividing central coefficients c0 or neighboring coefficients c1 through c5 of filters 312, 314, and 316 by weight w. For example, look-up table-based coefficient adjuster 336 can multiply neighboring coefficients c1 through c5 by weight w while maintaining central coefficients c0 of filters 312, 314, and 316. Also, look-up table-based coefficient adjuster 336 can multiply central coefficients c0 by a reciprocal number of the weight w while maintaining the neighboring coefficients c1 through c5 of filters 312, 314, and 316.

Figure 10:
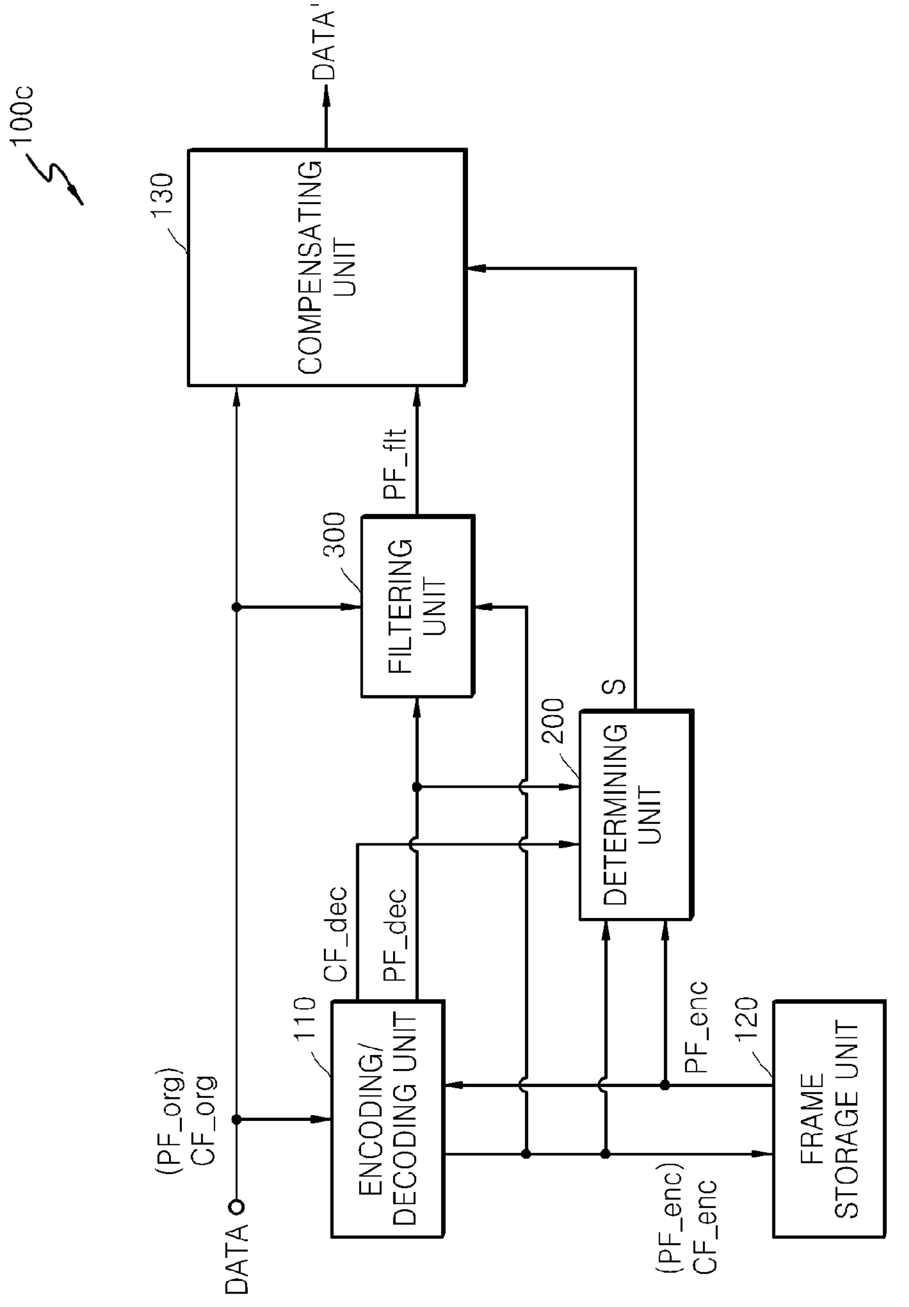
FIG. 10 is a block diagram of an image signal processing unit of an LCD device according to another embodiment of the inventive concept.

FIG. 10 is a block diagram of an image signal processing unit 100*c* of an LCD device according to another embodiment of the inventive concept. This embodiment represents one example of image signal processing unit 100 of LCD device 1, and it can be formed by combining features of image signal processing unit 100*a* of FIG. 2 with features of image signal processing unit 100*b* of FIG. 6.

Referring to FIG. 10, image signal processing unit 100*c* comprises encoding/decoding unit 110, frame storage unit 120, determining unit 200, filtering unit 300, and a compensating unit 130. Encoding/decoding unit 110, frame storage unit 120, and compensating unit 130 are implemented in the same manner as described above with reference to FIG. 2. Determining unit 200 of FIG. 10 can be implemented similar to determining unit 200 of FIG. 4 or determining unit 200*a* of FIG. 5, and filtering unit 300 can be implemented similar to filtering unit 300 of FIG. 6 or filtering unit 300 of FIG. 8.

Figure 11:
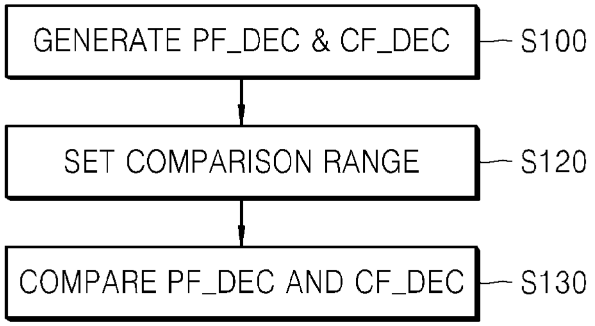
FIG. 11 is a flowchart illustrating a method of driving an LCD device according to an embodiment of the inventive concept.

FIG. 11 is a flowchart illustrating a method of driving an LCD device according to an embodiment of the inventive concept.

Referring to FIG. 11, the method begins by generating previous frame decoding data PF_dec and current frame decoding data CF_dec (S110). Previous frame decoding data PF_dec is generated by encoding and decoding previous frame data PF_org in a first mode. Current frame decoding data CF_dec is generated by encoding and decoding current frame data CF_org in a second mode.

Next, a comparison range is set (S120). For example, the comparison range can be set to a first effective range for the first mode, or a second effective range for the second mode. Thereafter, previous frame decoding data PF_dec and current frame decoding data CF_dec are compared (S130). Previous frame decoding data PF_dec and current frame decoding data CF_dec are compared within the comparison range set in operation S120.

Figure 12:
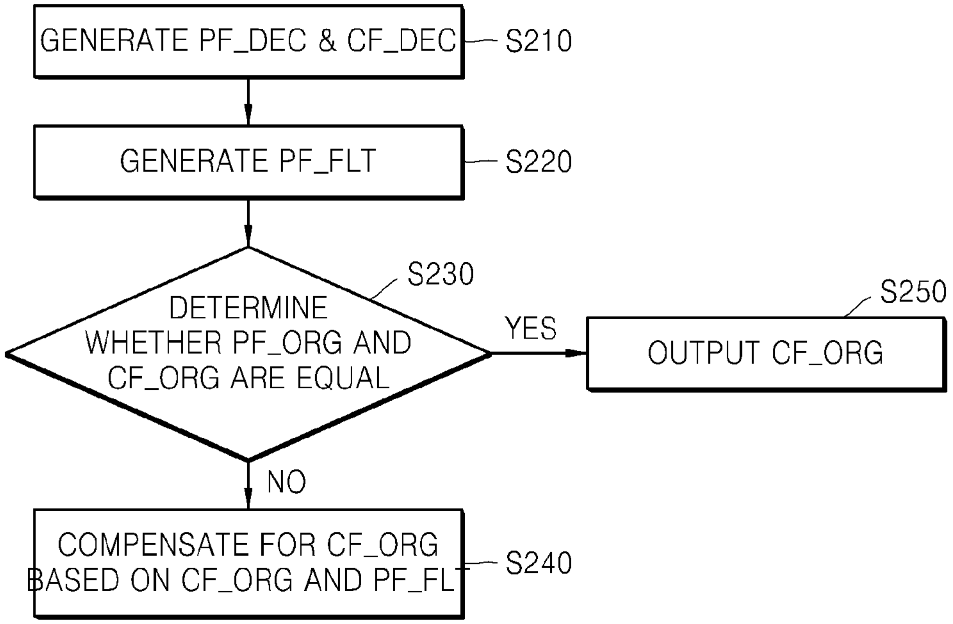
FIG. 12 is a flowchart illustrating a method of driving an LCD device according to another embodiment of the inventive concept.

FIG. 12 is a flowchart illustrating a method of driving an LCD device according to another embodiment of the inventive concept.

Referring to FIG. 12, the method begins by generating previous frame decoding data PF_dec and current frame decoding data CF_dec (S210). Previous frame decoding data PF_dec can be generated, for example, by encoding and decoding previous frame data PF_org. Current frame decoding data CF_dec can be generated, for example, by encoding and decoding current frame data CF_org.

Next, previous frame filtering data PF_flt is generated (S220). Previous frame filtering data PF_flt can be obtained, for example, by filtering the previous frame decoding data PF_dec. Then, it is determined whether previous frame data PF_org and current frame data CF_org are equal to each other (S230). For this determination, the previous frame decoding data PF_dec and the current frame decoding data CF_dec are compared to each other. If it is determined that previous frame data PF_org and current frame data CF_org are not equal to each other (S230=NO), current frame data CF_org is compensated for based on previous frame filtering data PF_flt and current frame data CF_org (S240). However, if it is determined that previous frame data PF_org and current frame data CF_org are equal to each other (S230=YES), current frame data CF_org is output (S250).

While the inventive concept has been particularly shown and described with reference to exemplary embodiments thereof, it will be understood that various changes in form and details may be made therein without departing from the scope of the following claims.

What is claimed is:

1. A method of driving a liquid crystal display (LCD) device, comprising:

generating comparison frame decoding data by encoding and decoding comparison frame data in a first mode;

generating reference frame decoding data by encoding and decoding reference frame data in a second mode;

setting a comparison range as a first effective range or a second effective range, wherein the first effective range corresponds to effective bits in the comparison frame decoding data, and the second effective range corresponds to effective bits in the reference frame decoding data;

comparing the comparison frame decoding data and the reference frame decoding data within the comparison range; and selecting the reference frame data or the comparison frame decoding data according to a result of the comparison;

where the reference frame data is selected, outputting the reference frame data; and where the comparison frame decoding data is selected, compensating the reference frame data based on the reference frame data and the comparison frame decoding data, and outputting reference frame compensation data.

2. The method of claim 1, wherein the comparison range is a smaller range among the first effective range and the second effective range.

3. The method of claim 1, wherein the comparison frame decoding data is generated by decoding comparison frame encoding data based on encoding information contained in the comparison frame encoding data, and wherein the reference frame decoding data is generated by decoding reference frame encoding data based on encoding information contained in the reference frame encoding data.

4. The method of claim 3, wherein setting the comparison range comprises:

generating first effective data corresponding to the first effective range, and second effective data corresponding to the second effective range; and generating comparison data corresponding to the comparison range by performing an AND operation on bits of the first effective data and bits of the second effective data, and wherein comparing the comparison frame decoding data and the reference frame decoding data comprises:

comparing reference frame comparison data generated by performing an AND operation on bits of the comparison data and bits of the reference frame decoding data, and comparison frame comparison data generated by performing an AND operation on bits of the comparison data and bits of the comparison frame decoding data.

5. The method of claim 1, further comprising, where the comparison frame decoding data and the reference frame decoding data are the same within the comparison range, outputting the reference frame data; and where the comparison frame decoding data and the reference frame decoding data are not the same within the comparison range, compensating the reference frame data based on the reference frame data and the comparison frame decoding data, and outputting reference frame compensation data.

6. The method of claim 1, wherein setting the comparison range comprises:

obtaining first error information corresponding to the first effective range and second error information corresponding to the second effective range; and setting a shift value as a greater value among a value of the first error information and a value of the second error information; and comparing the comparison frame decoding data and the reference frame decoding data comprises comparing comparison frame shift data generated by shifting the comparison frame decoding data by as much as the shift value, and reference frame shift data generated by shifting the reference frame decoding data by as much as the shift value.

7. The method of claim 1, further comprising:

generating comparison frame filtering data by filtering the comparison frame decoding data; and where the comparison frame decoding data and the reference frame decoding data are not the same within the comparison range, compensating the reference frame data based on the reference frame data and the comparison frame filtering data, and outputting reference frame compensation data.

8. An image signal processing unit for a liquid crystal display (LCD) device, comprising:

an encoding/decoding unit that generates comparison frame decoding data by encoding and decoding comparison frame data, generates reference frame decoding data by encoding and decoding reference frame data;

a determining unit that sets a comparison range based on effective bits in the comparison frame decoding data and effective bits in the reference frame decoding data, and compares the comparison frame decoding data and the reference frame decoding data within the comparison range; and a selection unit that selects the reference frame data or the comparison frame decoding data according to a result of the comparison;

where the reference frame data is selected, outputting the reference frame data; and where the comparison frame decoding data is selected, compensating the reference frame data based on the reference frame data and the comparison frame decoding data, and outputting reference frame compensation data.

9. The image signal processing unit of claim 8, further comprising a frame storage unit that stores an encoded version of the reference frame.

10. The image signal processing unit of claim 8, further comprising a compensating unit that compensates the comparison frame decoding data if the comparison frame decoding data and the reference frame decoding data differ from each other within the comparison range.

11. The image signal processing unit of claim 10, wherein the compensating unit does not compensate the comparison frame decoding data if the comparison frame decoding data and the reference frame decoding data are the same within the comparison range.

12. The image signal processing unit of claim 11, further comprising:

a filtering unit that filters the comparison frame decoding data to generate comparison frame filtering data, and outputs the comparison frame filtering data to the compensating unit.

* * * * *